United States Patent
Briscoe

(10) Patent No.: US 12,421,141 B2
(45) Date of Patent: Sep. 23, 2025

(54) WATER SANITISATION DEVICE, SYSTEM AND METHOD

(71) Applicant: WATERCO LIMITED, Rydalmere (AU)

(72) Inventor: Nicholas James Briscoe, Rydalmere (AU)

(73) Assignee: WATERCO LIMITED, Rydalmere (AU)

( * ) Notice: Subject to any disclaimer, the term of this patent is extended or adjusted under 35 U.S.C. 154(b) by 301 days.

(21) Appl. No.: 17/906,834

(22) PCT Filed: Mar. 22, 2021

(86) PCT No.: PCT/AU2021/050259
§ 371 (c)(1),
(2) Date: Sep. 20, 2022

(87) PCT Pub. No.: WO2021/189103
PCT Pub. Date: Sep. 30, 2021

(65) Prior Publication Data
US 2023/0150846 A1 May 18, 2023

(30) Foreign Application Priority Data
Mar. 23, 2020 (AU) .................. 2020900876

(51) Int. Cl.
*C02F 1/467* (2023.01)
*C02F 1/461* (2023.01)
(Continued)

(52) U.S. Cl.
CPC ........ *C02F 1/4674* (2013.01); *C02F 1/46104* (2013.01); *E04H 4/1281* (2013.01); *C02F 2103/42* (2013.01); *C02F 2201/4612* (2013.01); *C02F 2209/003* (2013.01); *C02F 2209/29* (2013.01); *C02F 2303/04* (2013.01)

(58) Field of Classification Search
CPC ...... C02F 1/46; C02F 1/32; C02F 1/72; C02F 1/00; B01D 32/34; E04H 4/12; A61L 2/00
See application file for complete search history.

(56) References Cited

U.S. PATENT DOCUMENTS

| | | |
|---|---|---|
| 4,324,635 A | 4/1982 | Sweeney |
| 5,084,149 A | 1/1992 | Kaczur et al. |
| 5,242,554 A | 9/1993 | Kaczur et al. |

(Continued)

FOREIGN PATENT DOCUMENTS

| | | |
|---|---|---|
| CN | 109055966 A | 12/2018 |
| DE | 10017407 A1 | 10/2001 |

(Continued)

OTHER PUBLICATIONS

"International Search Report and Written Opinion" mailed on Apr. 30, 2021 for PCT Application No. PCT/AU2021/050259, 17 pages.

*Primary Examiner* — Richard C Gurtowski
(74) *Attorney, Agent, or Firm* — Perkins Coie LLP; Viola Kung

(57) ABSTRACT

A method of sanitising a body of water including the steps of adding sodium chlorite and/or sodium chlorate to the body of water and converting the sodium chlorite and/or sodium chlorate to chlorine dioxide in an electrolysis cell which is in fluid communication with a water circulation system of the body of water.

3 Claims, 1 Drawing Sheet

(51) Int. Cl.
*E04H 4/12* (2006.01)
*C02F 103/42* (2006.01)

(56) References Cited

U.S. PATENT DOCUMENTS

| | | |
|---|---|---|
| 5,478,446 A | 12/1995 | Falgen et al. |
| 5,965,004 A | 10/1999 | Cowley et al. |
| 6,254,762 B1 * | 7/2001 | Uno .......................... C25B 1/30 |
| | | 204/263 |
| 7,179,363 B2 | 2/2007 | DiMascio et al. |
| 8,784,733 B2 | 7/2014 | Alarid et al. |
| 2004/0175322 A1 | 9/2004 | Woodruff et al. |
| 2004/0206707 A1 | 10/2004 | Polak |
| 2008/0308428 A1 | 12/2008 | Chen et al. |
| 2011/0024361 A1 * | 2/2011 | Schwartzel ............. C02F 1/467 |
| | | 204/290.01 |
| 2011/0062086 A1 | 3/2011 | Burns et al. |
| 2013/0071287 A1 * | 3/2013 | O'Connell ........... A61L 2/0094 |
| | | 422/600 |
| 2014/0158637 A1 * | 6/2014 | Franshaw ................ C02F 1/72 |
| | | 210/748.17 |

FOREIGN PATENT DOCUMENTS

| | | | |
|---|---|---|---|
| KR | 100445756 B1 | 8/2004 | |
| KR | 20070092931 A | 9/2007 | |
| WO | 9511326 A1 | 4/1995 | |
| WO | WO-03000595 A2 * | 1/2003 | .......... C02F 1/46104 |
| WO | 03016224 A1 | 2/2003 | |
| WO | 2003025252 A1 | 3/2003 | |
| WO | 2005117914 A2 | 12/2005 | |
| WO | 2016076584 A1 | 5/2016 | |

* cited by examiner

WATER SANITISATION DEVICE, SYSTEM AND METHOD

This application is a National Stage of International Application PCT/AU2021/050259, filed Mar. 22, 2021, which claims the benefit of priority to Australian Patent Application 2020900876, filed Mar. 23, 2020. The contents of the above-identified applications are incorporated herein by reference in their entireties.

TECHNICAL FIELD

The present application claims priority from Australian Provisional Patent Application No. 2020900876 (filed 23 Mar. 2020), the contents of which are incorporated in their entirety herein.

The present invention relates to a water sanitisation device, system and method. In particular, the present invention relates to the sanitisation of water for swimming pool and spa applications. However, it will be appreciated by those skilled in the art that the present invention may be utilised in other water treatment applications.

BACKGROUND OF THE INVENTION

There are several distinct aspects required to achieve safe swimming pool chemistry. Primarily, it is important to achieve adequate water sanitisation and water pH balance.

With respect to sanitisation, chlorine is typically used to sanitise the water in many pools and spas. Chlorine acts as a disinfectant to kill bacteria, algae and other harmful organisms. However, although chlorine is suitable for sanitisation, it is desirable to avoid over chlorinating the water, as the chlorine can have a strong taste and smell which may irritate some swimmers.

In addition to achieving the desired level of sanitisation, it is also necessary to achieve a pH balance of acidity and alkalinity. For most swimming pool applications, it is desirable to achieve a pH level of between 7.2 and 7.6. If the pH level becomes too low, for example below 7, the water becomes acidic. This can result in eye and skin irritation and corrosion of metal pump and impellor components. In contrast, if the pH level becomes too high, for example over 8, chlorine activity becomes slowed and inefficient, resulting in sub-standard sanitisation. This may result also in eye and skin irritation.

Chlorine is present in pool water in two forms:
1) Free chlorine residual—this is chlorine that has not reacted with any contaminants and is still available to disinfect pool water and oxidise organic substances; and
2) Combined chlorine—this is "used" chlorine, that has reacted with organic substances and is no longer available to disinfect the water.

Manually adding chlorine to a swimming pool is very labour intensive. In practice, this requires the pool water to be tested regularly, typically every two days to determine the required chlorine dose.

More recently there has been a trend toward saltwater pools which utilise salt chlorinators. Saltwater pools use salt chlorinators to convert common sodium chloride crystals into chlorine gas which is soluble in water. The sodium chloride is generally added to the pool water at a dose of around 4 kg per 1,000 litres.

Salt chlorinators generally use electrolysis to sanitise swimming pools, by passing salt water through an electrolytic cell which converts the salt water into chlorine gas and sodium.

One issue with existing salt chlorinators is that they suffer from salt and/or calcium build up on the cells. This typically requires the user to manually clean the cells regularly, for example every fortnight.

There are many factors which need to be considered when correctly dosing chlorine in a swimming pool. For example, the volume of water to be treated and the amount the pool is used (bathing load) are both relevant. In addition, sunlight and high ambient temperatures will result in increased dissipation of chlorine through evaporation, requiring increased chlorine dosing. As such, simply running a salt chlorinator continuously is not sufficient to provide the correct dose, as various site-specific factors need to be taken into consideration.

Chlorine dioxide is a chemical compound with the formula $ClO_2$. As one of several oxides of chlorine, chlorine dioxide is a potent and useful oxidizing agent which can be used in water treatment and in bleaching.

Chlorine dioxide has several applications within the water treatment industry, and it is particularly good at eliminating pathogens that chlorine cannot (for example, *cryptosporidium* can be killed with short contact time and low concentration of chlorine dioxide whilst chlorine requires long contact time and extremely high concentration). Chlorine dioxide does not form biproducts that cause obnoxious odours (unlike chlorine). Chlorine dioxide is generally used as a secondary sanitiser and still relies on chlorine as the primary sanitiser. There are many more potential applications for chlorine dioxide but there are several factors that have limited the commercial viability of mainstream use.

These limitations include but are not limited to the following:
  cost of production can be high;
  inconvenient to mix;
  some convenient forms of chlorine dioxide production (such as dissolvable tablets) are expensive and don't have full activation;
  in situ systems are expensive to operate and maintain. They can also be dangerous.
  in situ mixing of chlorine dioxide in liquid form poses OH&S issues. The mixture has a short shelf life once mixed on site.
  can be explosive if not mixed correctly;
  chlorine dioxide is highly corrosive and therefore difficult to maintain dosing equipment;
  chlorine dioxide easily gasses off in water when agitated; and
  chlorine dioxide breaks down when subjected to ultraviolet light.

Because of the above noted disadvantages, there are several reasons why chlorine dioxide is not widely used in water treatment, and certainly not as a primary sanitiser.

Any discussion of the prior art throughout the specification should in no way be considered as an admission that such prior art is widely known or forms part of common general knowledge in the field.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a method of sanitising a body of water including the steps of:

adding sodium chlorite and/or sodium chlorate to the body of water; and converting the sodium chlorite and/or sodium chlorate to chlorine dioxide in an electrolysis cell which is in fluid communication with a water circulation system of the body of water.

The method further preferably includes the step of adding hydrogen peroxide to the body of water.

Sodium chlorite and/or sodium chlorate is preferably added to the body of water to produce a target chlorine dioxide concentration of 0.1 to 0.8 ppm.

Sodium chlorite and/or sodium chlorate is preferably added to the body of water to produce a target chlorine dioxide concentration of 0.1 to 0.6 ppm.

Sodium chlorite and/or sodium chlorate is preferably added to the body of water to produce a target chlorine dioxide concentration of 0.1 to 0.5 ppm.

Sodium chlorite and/or sodium chlorate is preferably added to the body of water to produce a target chlorine dioxide concentration of 0.2 to 0.5 ppm.

Sodium chlorite and/or sodium chlorate is preferably added to the body of water to produce a target chlorine dioxide concentration of about 0.1 ppm, about 0.2 ppm, about 0.3 ppm, about 0.4 ppm, about 0.5 ppm, about 0.6 ppm, about 0.7 ppm, or about 0.8 ppm.

Sodium chlorite and/or sodium chlorate is preferably added to the body of water to produce a target chlorine dioxide concentration of about 0.3 ppm.

Hydrogen peroxide is preferably added to the body of water to produce a target hydrogen peroxide concentration of 10 to 250 ppm.

Hydrogen peroxide is preferably added to the body of water to produce a target hydrogen peroxide concentration of 30 to 250 ppm.

Hydrogen peroxide is preferably added to the body of water to produce a target hydrogen peroxide concentration of 30 to 200 ppm.

Hydrogen peroxide is preferably added to the body of water to produce a target hydrogen peroxide concentration of 30 to 150 ppm.

Hydrogen peroxide is preferably added to the body of water to produce a target hydrogen peroxide concentration of 30 to 100 ppm.

Hydrogen peroxide is preferably added to the body of water to produce a target hydrogen peroxide concentration of 30 to 75 ppm.

Hydrogen peroxide is preferably added to the body of water to produce a target hydrogen peroxide concentration of about 10 ppm, about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, or about 250 ppm.

Hydrogen peroxide is preferably added to the body of water to produce a target hydrogen peroxide concentration of about 10 ppm, about 30 ppm, about 100 ppm, about 150 ppm or about 200 ppm.

Hydrogen peroxide is preferably added to the body of water to produce a target hydrogen peroxide concentration of about 35 ppm.

Sodium chlorite and/or sodium chlorate is preferably added to the body of water to produce a target chlorine dioxide concentration of 0.1 to 0.8 ppm and hydrogen peroxide is preferably added to the body of water to produce a target hydrogen peroxide concentration of 10 to 250 ppm.

Sodium chlorite and/or sodium chlorate is preferably added to the body of water to produce a target chlorine dioxide concentration of 0.2 to 0.5 ppm and hydrogen peroxide is preferably added to the body of water to produce a target hydrogen peroxide concentration of 30 to 200 ppm.

Sodium chlorite and/or sodium chlorate is preferably added to the body of water to produce a target chlorine dioxide concentration of about 0.1 ppm, about 0.2 ppm, about 0.3 ppm, about 0.4 ppm, about 0.5 ppm, about 0.6 ppm, about 0.7 ppm, or about 0.8 ppm, and hydrogen peroxide is preferably added to the body of water to produce a target hydrogen peroxide concentration of about 10 ppm, about 20 ppm, about 30 ppm, about 40 ppm, about 50 ppm, about 60 ppm, about 70 ppm, about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, or about 250 ppm.

Sodium chlorite and/or sodium chlorate is preferably added to the body of water to produce a target chlorine dioxide concentration of about 0.3 ppm and hydrogen peroxide is preferably added to the body of water to produce a target hydrogen peroxide concentration of about 35 ppm.

1 to 10 grams of sodium chlorite and/or 0.5 to 5 grams of sodium chlorate are preferably added per thousand litres of the body of water.

About 3 grams of sodium chlorite and/or about 1.5 grams of sodium chlorate are preferably added per thousand litres of the body of water.

0.05 to 0.5 grams of hydrogen peroxide is preferably added per thousand litres of the body of water.

In a second aspect, the present invention provides a water sanitisation mixture comprising:
  sodium chlorite and hydrogen peroxide;
  sodium chlorate and hydrogen peroxide; or
  sodium chlorite, sodium chlorate and hydrogen peroxide.

The sanitisation mixture is preferably added directly to a body of water to be treated.

In a third aspect, the present invention provides a water sanitisation system comprising:
  an electrolysis cell configured to be installed in the water circulation system of a body of water, the electrolysis cell operable to convert sodium chlorite and/or sodium chlorate to chlorine dioxide;
  a control unit in communication with the electrolysis cell; and
  a sensor configured to detect a level of chlorine dioxide present in the body of water,
  wherein the control unit is configured to stop or slow the electrolysis cell when the sensor determines that a level of chlorine dioxide present in the body of water has exceeded a predetermined threshold.

The control unit is preferably configured to stop or slow the electrolysis cell when the sensor determines that the level of chlorine dioxide is 0.8 ppm or above.

The electrolysis cell is preferably controlled by the control unit in the following way:
  high chlorine dioxide production if sensed chlorine dioxide level is less than 0.1 ppm;
  low chlorine dioxide production if sensed chlorine dioxide level is between 0.1 and 0.8 ppm; and
  no chlorine dioxide production if sensed chlorine dioxide level is above 0.8 ppm.

The water sanitisation system further preferably comprises a sensor configured to detect a level of hydrogen peroxide present in the body of water.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
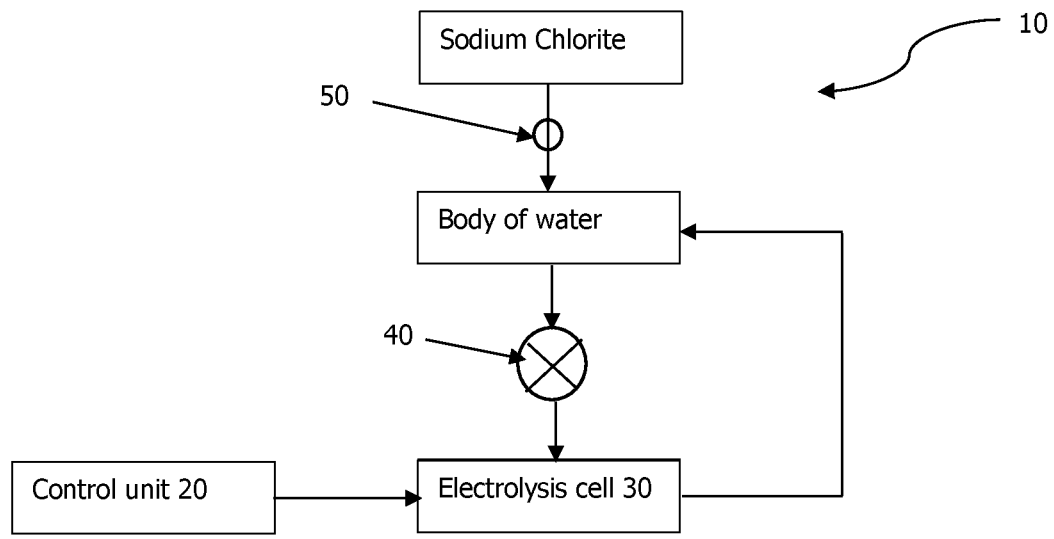
FIG. 1 is a diagram of a first embodiment of a method of sanitising water according to the invention.
Figure 2:
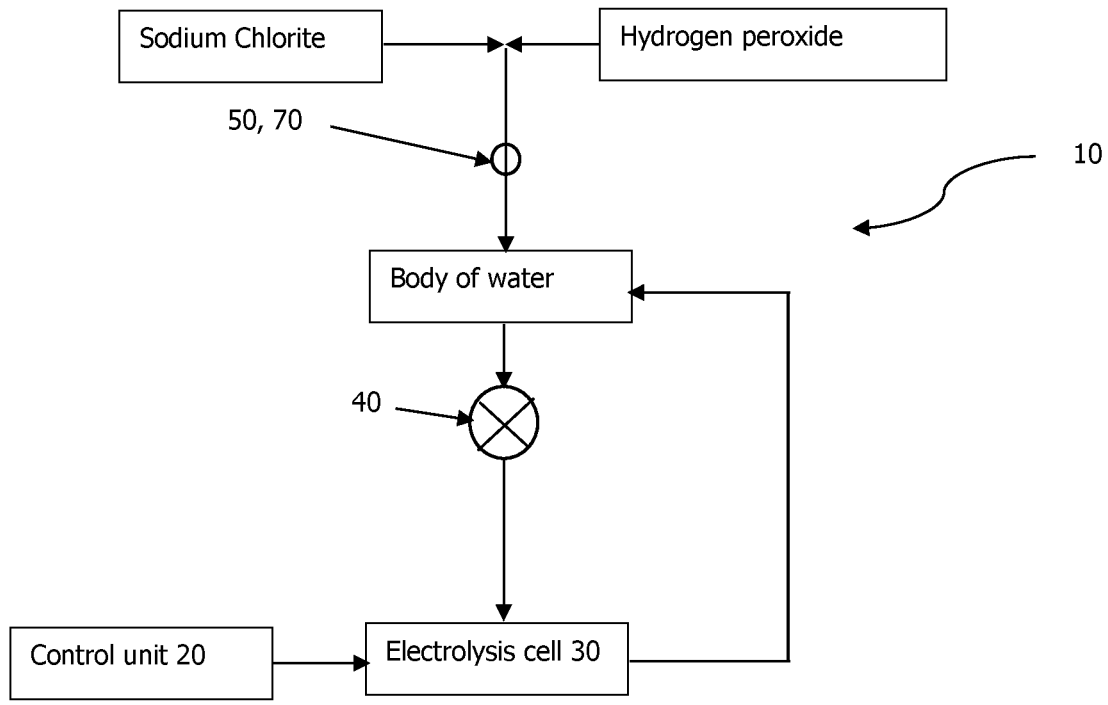
FIG. 2 is a diagram of a second embodiment of a method of sanitising water according to the invention.

There is disclosed herein a water treatment device and system 10, and a method of using the water treatment system 10 to sanitise water for swimming pools, spas and other water treatment applications.

As noted in the background, there are several disadvantages associated with using chlorine dioxide to sanitise water. In order to address these problems, the applicant has identified a new approach to form chlorine dioxide in water. Instead of using a traditional method of mixing sodium chlorite with an activator (usually hydrochloric acid) to prepare a substance ready formed to dose into the water, the applicant has separated out the main ingredient to the formation of chlorine dioxide (sodium chlorite ($NaClO_2$) and/or sodium chlorate ($NaClO_3$)) and added it directly into the water. An electrolysis process is then used to convert the sodium chlorite and/or sodium chlorate into chlorine dioxide whilst water is flowing through the electrochemical cell.

Some advantages of this process are as follows:
- all of the sodium chlorite and/or sodium chlorate added to the main body of the water will eventually be converted into chlorine dioxide;
- as the chemical process occurs in a flow through cell, the generation of chlorine dioxide is highly diluted and poses no safety issues;
- as the chlorine dioxide is highly diluted at the point of manufacture, the likelihood of damage from corrosion is eliminated, or at least significantly reduced;
- the convenience of generating chlorine dioxide from only adding sodium chlorite and/or sodium chlorate to the water reduces safety risk of having to pre-mix chemicals to form chlorine dioxide;
- the generation of chlorine from the process continues as normal even though chlorine dioxide is being produced simultaneously (only if hydrogen peroxide is not present);
- cost of production is dramatically reduced as activation of chlorine dioxide can be completed by the same equipment that would normally produce chlorine;
- the equipment used to generate chlorine dioxide in this way is inexpensive and will not be prone to breakdowns; and
- the shelf life of sodium chlorite is extremely long so this could be stored on site without fear of it deteriorating.

A further step has been added to this process. In particular, in one embodiment, when generating chlorine dioxide via electrolysis in the way described above, hydrogen peroxide is also added to the main body of the water. By adding hydrogen peroxide better outcomes are possible.

Hydrogen peroxide is a chemical compound with the formula $H_2O_2$. In its pure form, it is a pale blue, clear liquid, slightly more viscous than water. Hydrogen peroxide is the simplest peroxide (a compound with an oxygen-oxygen single bond). It is used as an oxidizer, bleaching agent, and antiseptic. Its chemistry is dominated by the nature of its unstable peroxide bond.

Hydrogen peroxide is unstable and slowly decomposes in the presence of light.

Because of its instability, hydrogen peroxide is typically stored with a stabilizer in a weakly acidic solution. Hydrogen peroxide is found in biological systems including the human body.

Enzymes that use or decompose hydrogen peroxide are classified as peroxidases.

Hydrogen peroxide has some limitations when used in water treatment applications.

Some of the limitations are as follows:
- biofilms are easily formed in reticulations lines;
- catalase enzyme can form in the water in response to bacteria—catalase will destroy hydrogen peroxide; and
- slow kill rate—hydrogen peroxide has a much slower bacterial deactivation rate than chlorine.

In light of the above noted disadvantages, hydrogen peroxide is not suitable as a primary sanitiser of swimming pools or spas if it is not used with a secondary biocide.

The applicant has discovered that some of the disadvantages associated with the use of chlorine dioxide, as noted in the background, can be overcome when chlorine dioxide is used in combination with hydrogen peroxide.

In particular, the applicant has found that when chlorine dioxide is used in conjunction with hydrogen peroxide it is far more stable in water. For example, field trials indicate that chlorine dioxide will last in water up to 5 times longer when used in conjunction with hydrogen peroxide. In addition to this, chlorine dioxide levels are not affected by agitation. As such, the need to continually add chlorine dioxide to maintain a residual level are greatly reduced when used in conjunction with hydrogen peroxide.

The electrolysis cell produces chlorine dioxide (generated from the electrolysis of sodium chlorite and/or sodium chlorate). As there is hydrogen peroxide present in the water, chlorine is no longer able to exist. Hydrogen peroxide is a dominating chemical over chlorine and therefore is quickly converted to a range of reactive oxygen species which include singlet oxygen, hydroxyl radicals and superoxides. Sodium chlorite/chlorate aids in the development of these reactive oxygen species (Ali and Mahmood 2017, *Environmental Toxicology* 32(4):1343-1353). All of these elements are efficient at deactivating pathogens in water in a way that is far more effective than conventional use of chlorine (Jeong et al 2006, *Environmental Science and Technology* 40(19):6117-22).

In addition, chlorine dioxide that is produced from this process also remains far more stable in the body of water, such as a swimming pool or spa. The process allows chlorine dioxide to remain active in water for up to and beyond 5 days. In addition to this, chlorine dioxide does not gas off when agitated. Also, ultraviolet light does not diminish the chlorine dioxide residual in the water.

The current invention relates to the combination of chlorine dioxide (generated by adding sodium chlorite/chlorate to the body of the water), hydrogen peroxide (added to the body of the water) and the electrolysis process (using standard saltwater chlorination hardware to convert sodium chlorite/chlorate to chlorine dioxide). The present invention relates to a revolutionary water treatment platform.

The electrolysis process can use low levels of TDS (total dissolved solids) due to new hardware that has been developed to enable electrolysis to occur at very low levels of TDS (as low as 600 ppm TDS which is the maximum allowable level of sodium in drinking water).

A traditional salt chlorinator used in a swimming pool application would require a TDS level of 4000-5000 ppm to enable chlorine to be produced. New hardware is also now available for swimming pool applications that can use lower TDS levels.

As a result of the above findings, the applicant proposes a new chemical compound or mixture that consists of a combination of sodium chlorite and/or sodium chlorate (alone or in combination with hydrogen peroxide) for adding to swimming pools and spas. This chemical could be in either powder or liquid form. However, it is also possible that the hydrogen peroxide and sodium chlorite/chlorate are separately provided and dosed into the body of water independently.

Catalase is a common enzyme found in nearly all living organisms exposed to oxygen (such as bacteria, plants, and animals). It catalyses the decomposition of hydrogen peroxide to water and oxygen. It is a very important enzyme in protecting the cell from oxidative damage by reactive oxygen species (ROS). Likewise, catalase has one of the highest turnover numbers of all enzymes, one catalase molecule can convert millions of hydrogen peroxide molecules to water and oxygen each second.

Chlorine dioxide controls the presence of catalase and allows hydrogen peroxide to function as a water treatment. Chlorine dioxide and hydrogen peroxide can co-exist.

Hydrogen peroxide is the dominant sanitiser so chlorine and hydrogen peroxide cannot co-exist. When hydrogen peroxide and sodium chlorite/chlorate are present in the body of water, chlorine dioxide is produced by electrolysis instead of instead of chlorine.

In chemistry, an oxidizing agent (oxidant, oxidizer) is a substance that has the ability to oxidize other substances—in other words to accept their electrons. Common oxidizing agents are oxygen, hydrogen peroxide and the halogens.

In one sense, an oxidizing agent is a chemical species that undergoes a chemical reaction in which it gains one or more electrons. In that sense, it is one component in an oxidation-reduction (redox) reaction.

Redox Reaction: $H_2O_2 + ClO_2 + OH^- \rightarrow O_2 + ClO_2 + H_2O$

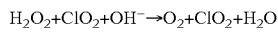

A redox reaction is a type of chemical reaction in which the oxidation states of atoms are changed. Redox reactions are characterized by the transfer of electrons between chemical species, most often with one species (the reducing agent) undergoing oxidation (losing electrons) while another species (the oxidizing agent) undergoes reduction (gains electrons). The chemical species from which the electron is stripped is said to have been oxidized, while the chemical species to which the electron is added is said to have been reduced.

The water treatment system 10 includes a control unit 20 which monitors and regulates chlorine dioxide production by the electrolytic cell 30. The control unit 20 is connected to a 240-volt AC mains power supply.

The water treatment system 10 includes a water circulation system having a pump 40 to circulate water from the pool, spa or other such body of water, to the electrolysis cell 30 and back to the body of water.

The electrolysis cell 30 consists of a series of titanium electrodes 32 with opposing charges. The electrodes 32 are housed in an electrode cage.

In operation, the control unit 20 provides electricity to the electrolysis cell 30 (anode and cathode) and holds an electrical potential difference between them for a designated period of time. The polarity may be subsequently reversed after that period of time has expired and then the anode becomes the cathode, and the cathode becomes the anode.

The reversing of polarity or electrical potential difference acts to remove any calcium build-up, which may have been deposited onto the cathode. Accordingly, this continuous reversing of polarity provides a self-cleaning functionality which keeps the electrolysis cell 30 clean from calcium deposits during its operation, providing the chemical balance and flow of the pool/spa water through the electrolysis cell 30 is maintained within normal parameters.

The control unit 20 may stop or slow the rate of electrolysis when a target amount of chlorine dioxide is reached in the body of water.

The control unit 20 may include a chlorine dioxide sensor 50, or alternatively may be connected to a chlorine dioxide sensor 50 which is configured to detect a level of chlorine dioxide present in the body of water.

The control unit 20 is configured to stop or slow the electrolysis cell 30 when the sensor determines that a level of chlorine dioxide present in the body of water has exceeded a predetermined threshold. The target level of chlorine dioxide is about 0.1 to 0.8 ppm.

The control unit 20 may also provide a warning, such as an alarm if the level of chlorine dioxide sensed by the sensor 50 is below 0.1 ppm or exceeds 0.8 ppm or some other predetermined threshold. Alternatively, the control unit 20 may switch off the electrolysis cell 30 if the level of chlorine dioxide sensed by the sensor 50 exceeds 0.8 ppm.

For example, the electrolysis cell 30 may be operated at three settings:

high chlorine dioxide production if sensed chlorine dioxide level is less than 0.1 ppm;

Low chlorine dioxide production if sensed chlorine dioxide level is between 0.1 and 0.8 ppm; and No chlorine dioxide production if sensed chlorine dioxide level is above 0.8 ppm.

The control unit 20 may also include a hydrogen peroxide sensor 70, or alternatively may be connected to a hydrogen peroxide sensor 70 which is configured to detect a level of hydrogen peroxide present in the body of water.

The control unit 20 may also provide a warning, such as an alarm or other such message if the level of hydrogen peroxide sensed by the sensor 70 is determined to be too low or too high. This can be used to prompt the pool owner or a technician to add more hydrogen peroxide to the body of water, or to take other suitable actions.

Although the invention has been described with reference to specific examples, it will be appreciated by those skilled in the art that the invention may be embodied in many other forms.

EXAMPLES

An apparatus was set up to simulate swimming pool conditions and followed the Australian Pesticides and Veterinary Medicines Authority (APMVA) guidelines. A water tank filled with 180 litres of water recirculates via an ECO 100 pump (Waterco) set at low speed. A Hydrochlor® head unit (Waterco) is connected to a 13-plate low salt cell which is set to run at 100% during the test. A Digiheat unit (Waterco) is set up to control temperature during the tests. A FlowVis® valve (Waterco) was used to estimate flow rate through the apparatus. Testing equipment used was a Pooltest 25 photometer (Palintest) to monitor Hydrogen Peroxide, Alkalinity, Calcium Hardness, Total and Free Copper and pH. A Kemio™ test kit (Palintest) was used to monitor chlorine dioxide levels. A WDPHRH PER Swimming Pool controller was used to monitor pH and oxidation-reduction potential (ORP) during the tests.

The following chemicals were added to a test tank filled with 180 litres of potable water to achieve target $H_2O_2$ and $ClO_2$ concentrations and mimic pool water (for quantities see Table 1):
- Hydrogen Peroxide=Perox 598 (Waterco)—50% concentration
- Sodium Chlorite=Zydox Sodium Chlorite solution (Zychem)—6% concentration
- Copper=Concide (Water)—3.2% concentration
- Benzalkonium chloride=Algatrol Concentrate (Waterco)—40% concentration
- Enzyme=Perox Activate (Waterco)—proprietary blend to control biofilm.

The target $H_2O_2$ and $ClO_2$ concentrations were as follows:
Solution 1=200 ppm $H_2O_2$ and 0.6 ppm $ClO_2$
Solution 2=75 ppm $H_2O_2$ and 0.5 ppm $ClO_2$
Solution 3=35 ppm $H_2O_2$ and 0.4 ppm $ClO_2$

TABLE 1

|  | Solution 1 | Solution 2 | Solution 3 | Control |
|---|---|---|---|---|
| $H_2O_2$ | 75 ml | 25 ml | 8 ml | 0 ml |
| Sodium chlorite | 30 ml | 30 ml | 15 ml | 0 ml |
| Copper | 4 ml | 1 ml | 1 ml | 0 ml |
| Benzalkonium chloride | 3 ml | 1 ml | 1 ml | 0 ml |
| Enzyme | 3 ml | 1 ml | 1 ml | 0 ml |

The electrolysis unit was turned on and run at 175 l/min flow rate (28° C. & pH 7.4). Once the target $H_2O_2$ and $ClO_2$ concentrations were achieved, pathogens (*E. coli* or *P. aeruginosa*) were spiked into the tank.

Samples were taken at 30 second intervals for *E. coli* and 2 minute intervals for *P. aeruginosa* (as per APVMA guidelines) and analysed for live colonies (Table 2 and Table 3)

TABLE 2

| Exposure time | E. coli CFU/100 mL | | |
|---|---|---|---|
| (min) | Solution 1 | Solution 2 | Solution 3 |
| stock culture | 38,000,000,000 | 38,000,000,000 | 84,000,000,000 |
| system recovery | 31,065,693 | 31,065,693 | 68,671,532 |
| 0.5 | <1 | <1 | <1 |
| 1 | <1 | <1 | <1 |
| 1.5 | <1 | <1 | <1 |
| 2 | <1 | <1 | <1 |
| 2.5 | <1 | <1 | <1 |
| 3 | <1 | <1 | <1 |
| 3.5 | <1 | | |
| 4 | <1 | | |
| 4.5 | <1 | | |
| 5 | <1 | | |
| 5.5 | <1 | | |
| 6 | <1 | | |
| Log reduction | 7.49 | 7.49 | 7.84 |

TABLE 3

| Exposure time | P. aeruginosa CFU/100 mL | | |
|---|---|---|---|
| (min) | Solution 1 | Solution 2 | Solution 3 |
| stock culture | 16,500,000,000 | 11,000,000,000 | 84,000,000,000 |
| system recovery | 31,065,693 | 31,065,693 | 78,514,705 |
| 2 | <1 | 1 | 1 |
| 4 | <1 | <1 | <1 |
| 6 | <1 | <1 | <1 |
| 8 | <1 | <1 | <1 |
| 10 | <1 | <1 | <1 |
| 12 | <1 | <1 | <1 |
| Log reduction | 7.53 | 7.36 | 7.89 |

Levels of $H_2O_2$, $ClO_2$, ORP, total alkalinity (ALK), calcium hardness (CAL), Copper (total), Copper (free) and TDS were also monitored (see Table 4, values in ppm).

TABLE 4

|  | Solution 1 | | Solution 2 | | Solution 3 | | Control | |
|---|---|---|---|---|---|---|---|---|
|  | Start | Finish | Start | Finish | Start | Finish | Start | Finish |
| $H_2O_2$ | 227 | 218 | 76 | 76 | 31 | 29 | 0 | 0 |
| $ClO_2$ | 0.47 | 0.45 | 0.21 | 0.08 | 0.31 | 0.52 | 0 | 0 |
| ORP | 294 | 267 | 245 | 84 | 263 | 126 | 0 | 0 |
| ALK | 80 | 70 | 85 | 95 | 100 | 97 | 85 | 85 |
| CAL | 147 | 139 | 157 | 123 | 156 | 154 | 167 | 164 |
| Cu (total) | 0.96 | 0.7 | 0.34 | 0.16 | 0.24 | 0.23 | 0 | 0 |
| Cu (free) | 0.86 | 0.6 | 0.22 | 0.16 | 0.21 | 0.21 | 0 | 0 |
| TDS | 3200 | 3500 | 3200 | 3300 | 3200 | 3300 | 3100 | 3100 |

The results showed that all test solutions produced a bacterial reduction of better than 7 Log (a minimum of 4 Log reduction is required to demonstrate a similar bacterial deactivation when using chlorine to deactivate the same pathogens test) and demonstrate that the combination of hydrogen peroxide and chlorine dioxide is a powerful disinfectant, even at low concentrations (35 ppm hydrogen peroxide, 0.3 ppm chlorine dioxide).

Water tests done during lab efficacy testing and field trials revealed free chlorine was testable in the samples, but voltage readings were below 300 mV. Field trials indicate that there is a relationship between hydrogen peroxide levels and free chlorine test results. If the hydrogen peroxide levels are above 200 ppm a free chlorine test will return a result will be almost zero. At hydrogen peroxide levels lower than 100 ppm free chlorine tests begin to become detectable in the range of 0.2-0.3 ppm. At hydrogen peroxide levels between 15-30 ppm free chlorine tests range from 0.7-1.1 ppm. At hydrogen peroxide levels lower than 10 ppm a slight chlorine odour can be detected when in contact with the water but not detectable within the swimming pool environment. This is significant in relation to compliance with local health departments that require free chlorine to be measurable in order to comply with health department guidelines that are enforced on the operators of commercial swimming pools. Based on the field trails that have been undertaken an operating range of the following is achievable:

Hydrogen peroxide 20 to 40 ppm
Chlorine dioxide 0.2 to 0.4 ppm
Free chlorine 0.7 to 1.0 ppm The control method for adding hydrogen peroxide under these conditions can be done in several ways. Amperometric probes measuring hydrogen peroxide or free chlorine can be used to control the chemical concentrations in the swimming pool.

A hydrogen peroxide probe can be set to dose to control a desired peroxide level. Alternatively a free chlorine probe can be used which will dose hydrogen peroxide when a maximum free chlorine level is achieved in order to prevent free chlorine becoming dominant in the water.

The rate of consumption of chlorite/chlorite was calculated based on field trials. An electrolysis unit (rated to produce 30 grams of chlorine per hour at optimum TDS and operating 8 hours per day in a 50,000 litre pool) will consume 1 ppm of chlorite and 0.5 ppm of chlorate every 30 days.

The rate of consumption of hydrogen peroxide was calculated based on field trails. An electrolysis unit (rated to produce 30 grams of chlorine per hour at optimum TDS and operating 8 hours per day in a 50,000 litre pool) will consume between 750-1000 ml of hydrogen peroxide per day.

The rate of chlorine dioxide production was calculated based on field trails. An electrolysis unit (rated to produce 30 grams of chlorine per hour at optimum TDS and operating 8 hours per day in a 50,000 litre pool) will produce a consistent level of 0.2-0.4 ppm chlorine dioxide from a solution containing a minimum level of 1 ppm chlorite and 0.5 ppm chlorate.

One of the chemical reactions that was noted during the efficacy test is the chlorine dioxide rate is dramatically affected by the spike of pathogens. Hydrogen peroxide is not affected in the same way—the reduction of hydrogen peroxide after spiking that pathogens was minimal. Accordingly, a higher hydrogen peroxide may be beneficial in a situation where high bather loads are going to be experienced. In the event of the chlorine dioxide level being temporally reduced due to bather load, hydrogen peroxide can act as a secondary sanitiser to protect swimmers whilst the chlorine dioxide levels are brought back to target levels via electrolysis.

The invention claimed is:

1. A method of sanitizing a body of water in a swimming pool or spa,
including the steps of:
adding sodium chlorite and/or sodium chlorate to the body of water;
adding hydrogen peroxide to the body of water;
converting the sodium chlorite and/or sodium chlorate to chlorine dioxide in an electrolysis cell which is in fluid communication with a water circulation system of the body of water;
detecting a level of chlorine dioxide present in the body of water with a sensor; and
stopping or slowing the electrolysis cell when the sensor determines that the level of chlorine dioxide present in the body of water has exceeded a predetermined threshold, wherein about 3 grams of sodium chlorite and/or about 1.5 grams of sodium chlorate is added per thousand litres of the body of water.

2. A method of sanitizing a body of water in a swimming pool or spa, including the steps of:
adding sodium chlorite and/or sodium chlorate to the body of water;
adding hydrogen peroxide to the body of water;
converting the sodium chlorite and/or sodium chlorate to chlorine dioxide in an electrolysis cell which is in fluid communication with a water circulation system of the body of water;
detecting a level of chlorine dioxide present in the body of water with a sensor; and
stopping or slowing the electrolysis cell when the sensor determines that the level of chlorine dioxide present in the body of water has exceeded a predetermined threshold, wherein 0.05 to 0.5 grams of hydrogen peroxide is added per thousand litres of the body of water.

3. A water sanitization system comprising:
an electrolysis cell arranged in a water circulation system of a body of water in a swimming pool or spa, the body of water containing a) sodium chlorite and/or sodium chlorate and b) hydrogen peroxide, the electrolysis cell operable to convert sodium chlorite and/or sodium chlorate to chlorine dioxide;
a control unit in communication with the electrolysis cell; and
a sensor configured to detect a level of chlorine dioxide present in the body of water,
wherein the control unit is configured to stop or slow the electrolysis cell when the sensor determines that a level of chlorine dioxide present in the body of water has exceeded a predetermined threshold;
wherein the electrolysis cell is controlled by the control unit in the following way:
high chlorine dioxide production if sensed chlorine dioxide level is less than 0.1 ppm;
low chlorine dioxide production if sensed chlorine dioxide level is between 0.1 and 0.8 ppm; and
no chlorine dioxide production if sensed chlorine dioxide level is above 0.8 ppm.

* * * * *